Dec. 7, 1954 S. C. HETH 2,696,089
POWER TAKE-OFF CONSTRUCTION
Filed July 14, 1950 2 Sheets-Sheet 2

INVENTOR.
SHERMAN C. HETH
BY
Emerson B Donnell
ATTORNEY.

United States Patent Office 2,696,089
Patented Dec. 7, 1954

2,696,089

POWER TAKE-OFF CONSTRUCTION

Sherman C. Heth, Racine, Wis., assignor to J. I. Case Company, Racine, Wis., a corporation of Wisconsin Application July 14, 1950, Serial No. 173,811

4 Claims. (Cl. 64—4)

The present invention relates to power take-offs and an object thereof is to generally improve the construction and operation of devices of this class.

In applying a power take-off to transmit driving power, for example between a drawn implement and a tractor, there is usually a short section of rotating drive shaft extending between a more or less permanent shaft section on the tractor and a relatively permanent shaft section on the implement. This short section bridges the necessary gap between these permanent shaft portions and is constituted to compensate for the continual variation in relative position of these two shaft sections as the tractor and implement change direction and negotiate uneven ground. Typically the shaft is made with two telescoping sections slidably but non-rotatively joined to each other. At the two ends of the assemblage are located universal joints. The telescoping function allows for relative axial displacement of the permanent shafts while the universal joints permit swinging either from side to side or up and down or any combination thereof. Such a shaft rotates rapidly when in operation and is inherently dangerous. For this reason, various types of shields have been developed to cover and in fact partially enclose these shafts. To facilitate coupling and uncoupling of the shaft, these shields have been heretofore made readily removable but since some slight attention is necessary in order to replace them after such removal there is always the temptation to leave them off and operate the implement without the shields in place. Accordingly the principal object of the present invention is to provide such a shield which, once assembled with its shaft need not be removed for coupling or uncoupling thereof or in fact cannot be removed without destroying or at least mutilating either the shield or the shaft. A further object is to provide such a shield which will prevent or at least render impractical the operation of the tractor and implement unless the shield is in place in its proper relation to the shaft.

Further objects are to provide expedients for the realization of the above objects.

Further objects will become apparent from the following specification and accompanying drawings in which a satisfactory embodiment of the invention is shown but it is to be understood that the invention is not intended to be limited to the construction disclosed or in fact in any manner except as herein set forth.

Figure 1:
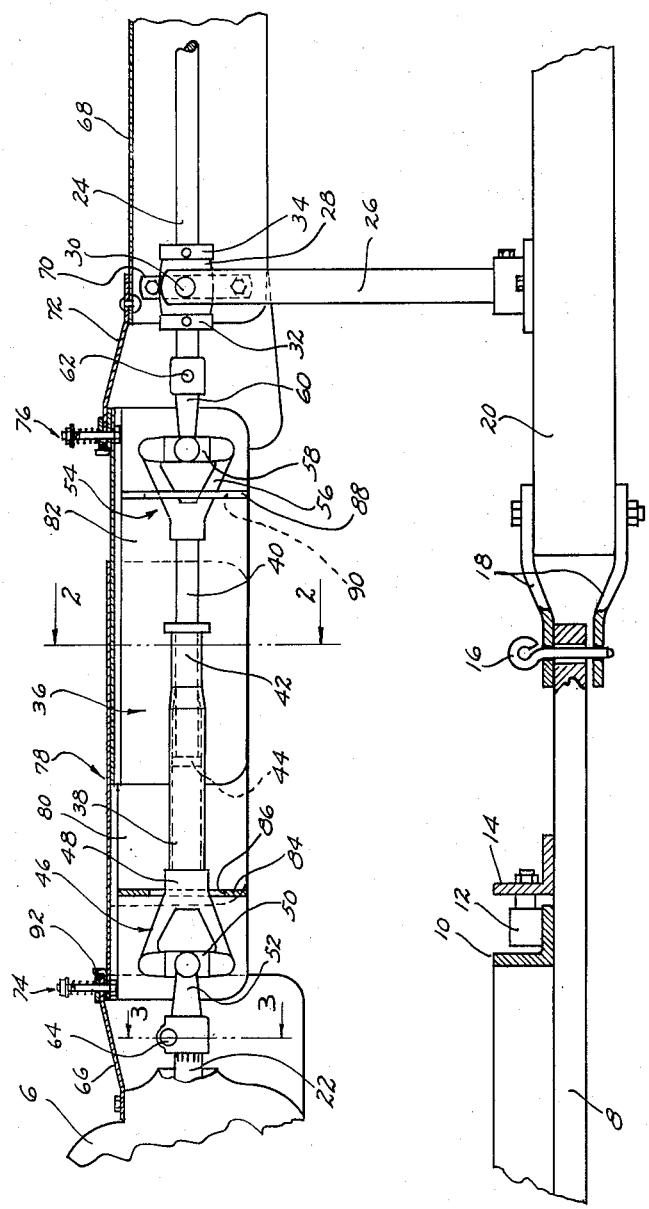
Fig. 1 is a vertical axial cross section of a power take-off shaft provided with a shield embodying the invention.

In the drawings 6 represents a fragment of a tractor having a drawbar 8 which is guided for swinging movement by a quadrant 10 as by a roller 12 connected to the draw bar by a bracket 14. Draw bar 8 supports and propels implements of various kinds from time to time and in the present instance is connected by means of a hitch pin 16 with a clevis 18 fixed to a draw bar 20 of such an implement, the particular implement forming no part of the invention, it will not be further described. Tractor 6 has a permanently attached power take off shaft or stub shaft 22 while a permanently attached power take-off or more properly power receiving shaft 24 is permanently carried by the associated implement and spaced above draw bar 20 by means of a standard 26 carrying a steady bearing 28 supported in the present instance by trunnions as 30. Shaft 24 is prevented from shifting axially by collars 32 and 34 and in operation driving power is transmitted from shaft 22 on the tractor to shaft 24 on the implement by means of an extensible joint shaft generally designated as 36 so that shifting of tractor 6 in relation to draw bar 20 will not interrupt or interfere wtih the transmission of power between shafts 22 and 24.

Shaft 36 comprises a section 38 into which telescopes a section 40, section 38 having a reduced square or angular portion 42 within which section 40 is freely slidable but non-rotatable so that rotation of section 38 causes equivalent rotation of section 40. In the present instance, section 38 is appreciably larger than section 40, except for portion 42, and portion 40 has a piston-like stop element 44 within portion 38 which is permanently united with section 40 and positively prevents, once the device is assembled, withdrawal of section 40 from section 38. Section 38 has a universal joint generally designated as 46 having a fork portion 48 permanently united as for example by welding to said section 38, joint 46 also having a cross 50 and a fork portion 52. In like manner section 40 has a universal joint generally designated as 54 including a fork portion 56 welded or otherwise permanently attached to said section 40. Joint 54 has a cross 58 and a fork portion 60, cross portions 50 and 58 being pivotally united respectively with fork portions 48—52 and 56—60 in any suitable manner well-known to those skilled in the art. It will be noted that, once section 40 is inserted within section 38 it is a simple matter to weld forks 48 and 56 respectively with sections 38 and 40 after which it will be impossible to remove one section from the other without first mutilating or destroying the assemblage. This constitutes an important safety feature as will appear.

Fork portion 60 is preferably permanently united with above mentioned shaft 24 as for example by a rivet 62 so that it cannot readily be removed therefrom. Fork portion 52 on the other hand is removably fixed to shaft section 22 in a suitable manner as for example by a spring urged plunger 64 of well-known form so that shaft 36 may be uncoupled at such times as it is desired to disconnect draw bar 20 from tractor 6. This is done as will be apparent by removing coupling pin 16. In the past accidents have occurred when pin 16 was accidently dislodged or perhaps omitted when coupling was being effected, in this event older type power take-offs having their sections corresponding to 38 and 40 separated whereupon the section connected with the tractor could thrash about and cause damage or injury. In the present instance this cannot happen because sections 38 and 40 cannot be separated and the strength of the parts is such that the implement will be propelled or the tractor stalled without breakage or damage to the power take-off. It is to be observed that section 40 with stop portion 44 in place can be inserted, before joints 46 and 54 are applied, through the end of portion 38 where joint 46 will eventually be applied.

Tractor 6 is provided with a downwardly open permanently attached shield portion 66 which extends over portion 22 and down at either side thereof and which is open toward the rear. In similar manner, a shield 68 is arranged about shaft 24 and in the present instance supported by a strap 70 carried by standard 26. A shield extension 72 is permanently fastened to shield 68 and partially encloses the forward extremity of shaft 24. Spring clips of well-known form generally designated as 74 and 76 engaged respectively with shield portions 66 and 72 support an extensible shield generally designated as 78 and which extends about and downwardly on either side of shaft 36. Thus the several sections of the power take-off shafts 22, 36 and 24 together with joints 46 and 54 are enclosed within the several connected shields so that they cannot constitute a source of danger to operators nearby.

Shield 78 comprises a section 80 within which is telescopically associated a section 82, the dimensions being such that sections 80 and 82 will remain slidably connected throughout the entire range of telescoping action of shaft 36. A section 80 is provided with an apertured retaining member 84 preferably, although not necessarily, in the form of a ring having an opening 86 so proportioned as to prevent the passage therethrough of joint 46. Retaining member 84 is permanently united with shield portion 80. In similar manner shield portion 82 is provided with a similar apertured retaining element 88 providing an opening 90 which is too small to admit joint 54. It will now be apparent that, with joint 46 disconnected from shaft 22, shield 78 will be retained on shaft 36 and that it cannot be removed axially therefrom or in any other direction because retaining elements 84 and 88 will not pass beyond joints 46 and 54. With joint shaft 36 fully extended, shield portions 80 and 82 will remain slidably engaged because of the limit of longitudinal extension defined by engagement of elements 84 and 88 with joints 46 and 54.

Coupling and uncoupling of joint 46 with shaft 22 is readily effected by sliding shield portion 80 rearwardly to the dotted position indicated which gives ready access to plunger 64. However the mechanism cannot be operated with portion 80 in this position since the shield portion would rest upon joint 46 and any operation of the latter would make a disagreeable noise and in time damage shield portion 80. Accordingly it is necessary to extend the shield and engage spring clip 74 before operation is practical.

Figure 2:
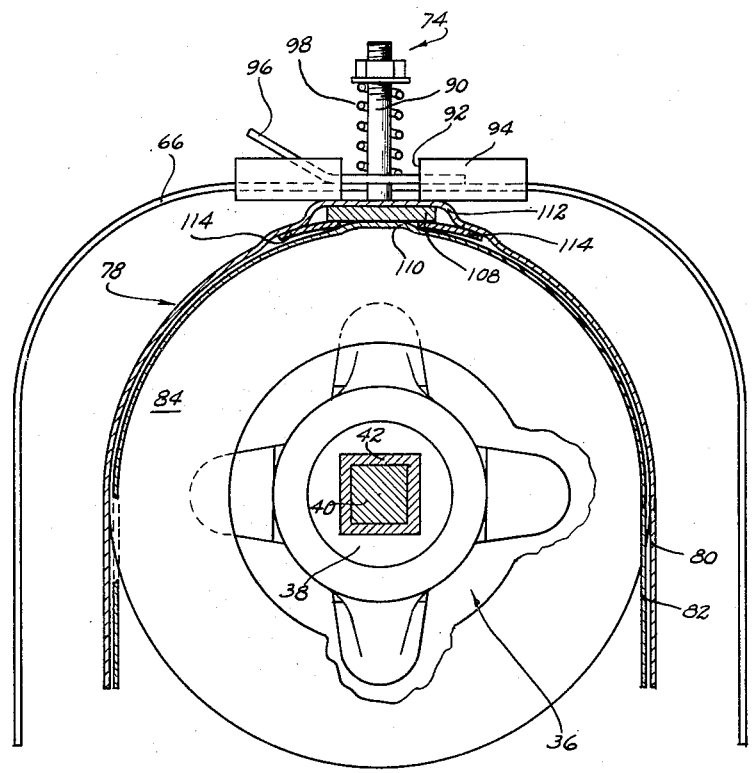
Fig. 2 is a sectional view taken on the line 2—2 of Fig. 1.

Spring clip 74, see also Fig. 2, comprises a bolt 90 extending through a slot 92 in a turned up portion 94 of shield 66 and engaged with shield portion 80. A detent 96 is pressed downwardly by spring 98 about the margins of slot 92 and forwardly of turned up portion 94. Thus shield portion 80 is retained in place and can rock in substantially any direction by virtue of yielding of spring 98. However lifting of detent 96 against spring 98 will permit its escape from slot 92 along with bolt 90 and shield section 80. Spring clip 76 is preferably, although not necessarily, of identical construction although disengagement of both spring clips 74 and 76 will still not permit removal of shield 78.

Figure 3:
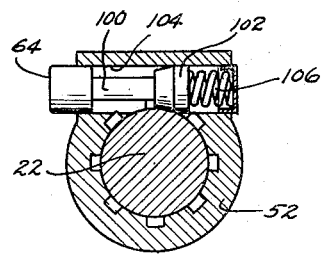
Fig. 3 is a sectional view taken on the line 3—3 of Fig. 1.

Plunger 64, as best seen in Fig. 3, has a necked portion 100 and an enlarged detent portion 102 both slidable in a bore 104 transversely arranged with respect to the axis of fork portion 52. Above mentioned shaft 22 is preferably splined as indicated to receive fork 52, the splines on shaft 22 having an interrupted groove or path surrounding the shaft into which detent portion 102 is forced by a spring 106. In this manner fork 52 is positively prevented from moving axially on shaft 22, but shifting detent 102 to the right as seen in Fig. 3 by pressure on plunger 64 will remove detent 102 from the path above mentioned and permit fork 52 to slide freely off of shaft section 22. In applying fork 52 to shaft 22, this procedure is reversed as will be apparent.

Sections 80 and 82 may be telescopically connected in various well-known ways within the contemplation of the invention, in the present instance a strip 108, Fig. 2, being welded or otherwise fixed to a struck-up portion 110 of shield portion 82 and received within the struck-up portion 112 of shield portion 80. A strip 114 is fixed to shield portion 80 on either side of struck-up portion 110 and extends beneath strip 108. In this way, strip 108 is retained between strips 114—114 and struck-up portion 112 so that portions 80 and 82 are freely slidable with relation to each other but otherwise are fixed together.

The operation of the arrangement is thought to be clear from the above description, it being apparent that shield 78 cannot be removed from shaft 36 and that operation of the shaft will be impractical unless shield 78 is properly retained in place by spring clips 74 and 76.

The above being a complete description of an illustrative embodiment of the invention, what is claimed as new and desired to be secured by Letters Patent of the United States is:

1. In a power take-off shaft the combination of a pair of permanently united interconnected telescoping shaft sections having enlarged universal joint portions distal from the point of interconnection of said sections, a pair of interconnected telescoping channel-like shield sections disposed about said shaft sections in position to protect them from contact with extraneous objects, means for so supporting said shield sections, and an apertured retaining member permanently united with each shield section and through which said shaft sections extend, the openings of said retaining members being so proportioned as to freely axially admit said shaft sections but to prevent passage therethrough of said enlarged universal joint portions so that said shield can be removed from protective relation with said shaft only by mutilation.

2. In a power take-off shaft the combination of a pair of permanently united interconnected telescoping shaft sections having enlarged end portions distal from the point of interconnection of said sections, a pair of interconnected telescoping channel-like shield sections disposed about said shaft sections in position to protect them from contact with extraneous objects, means for so supporting said shield sections, and an apertured retaining member permanently united with each shield section and through which said shaft sections extend, the openings of said retaining members being so proportioned as to freely axially admit said shaft sections but to prevent passage therethrough of said enlarged end portions so that said shield can be removed from protective relation with said shaft only by mutilation.

3. In a power take-off shaft the combination of a pair of permanently united interconnected telescoping shaft sections having enlarged universal joint portions distal from the point of interconnection of said sections, a pair of overlapping interconnected telescoping shield sections disposed about said shaft sections in position to protect them from contact with extraneous objects, means for so supporting said shield sections, an apertured retaining member permanently united with each shield section and through which said shaft sections extend, the openings of said retaining members being so proportioned as to freely axially admit said shaft sections but to prevent passage therethrough of said enlarged universal joint portions, the amount of overlap of said shield sections being such that they remain interconnected although extended to the greatest amount possible when said apertured retaining members are in engagement with their respective universal joint portions, so that said shield can be removed from protective relation with said shaft only by mutilation.

4. In a power take-off shaft the combination of a pair of permanently united interconnected telescoping shaft sections having enlarged portions distal from the point of interconnection of said sections, a pair of overlapping interconnected telescoping shield sections disposed about said shaft sections in position to protect them from contact with extraneous objects, means for so supporting said shield sections, an apertured retaining member permanently united with each shield section and through which said shaft sections extend, the openings of said retaining members being so proportioned as to freely axially admit said shaft sections but to prevent passage therethrough of said enlarged portions, the amount of overlap of said shield sections being such that they remain interconnected although extended to the greatest amount possible when said apertured retaining members are in engagement with their respective enlarged portions, so that said shield can be removed from protective relation with said shaft only by mutilation.

References Cited in the file of this patent

UNITED STATES PATENTS

| Number | Name | Date |
| --- | --- | --- |
| 2,027,329 | Van Ranst | Jan. 7, 1936 |
| 2,443,035 | Hardy | June 8, 1948 |